United States Patent [19]
Yoshino

[11] Patent Number: 5,129,135
[45] Date of Patent: Jul. 14, 1992

[54] REPAIR METHOD FOR EXTERIOR ON A CONCRETE STRUCTURE

[75] Inventor: Yousuke Yoshino, Kawagoe, Japan
[73] Assignee: Yoshino Seiki Inc., Saitama, Japan
[21] Appl. No.: 716,973
[22] Filed: Jun. 18, 1991
[30] Foreign Application Priority Data
  Jun. 18, 1990 [JP] Japan .................. 2-159475
[51] Int. Cl.⁵ .................................... B23P 7/00
[52] U.S. Cl. ................ 29/402.14; 29/402.18; 29/525.1; 29/527.1
[58] Field of Search .......... 29/402.09, 402.14, 402.18, 29/525.1, 407, 897.1, 402.01, 527.1; 411/32, 41, 54, 55, 60, 61, 71, 72, 73

[56] References Cited

U.S. PATENT DOCUMENTS

| | | |
|---|---|---|
| 2,400,142 | 5/1946 | Tinnerman . |
| 2,804,797 | 9/1957 | Seely . |
| 4,034,462 | 7/1977 | Hentges .............. 29/402.14 |
| 4,235,151 | 11/1980 | Udert et al. . |
| 4,719,552 | 4/1990 | Crawford . |

FOREIGN PATENT DOCUMENTS

| | | |
|---|---|---|
| 3622937 | 1/1988 | Fed. Rep. of Germany . |
| 2369903 | 7/1978 | France ................ 29/402.14 |
| 111449 | 9/1967 | Norway . |
| 1384360 | 3/1988 | U.S.S.R. ............ 29/402.14 |
| 2193550 | 2/1988 | United Kingdom . |

*Primary Examiner*—Timothy V. Eley
*Attorney, Agent, or Firm*—Wenderoth, Lind & Ponack

[57] ABSTRACT

An exterior material, such as a tile, which is likely to flake due to cracks or other possible defects in the wall base of a concrete structure, can be effectively repaired by boring an anchor hole extending from the surface of the exterior material to the concrete wall base, and inserting and expanding an expansion anchor bolt in the anchor hole. By using a drilling device capable of spouting out a cooling fluid while drilling, even hard nonmetallic material, such as ceramic tile, can be effectively bored to form a suitable anchor hole.

6 Claims, 5 Drawing Sheets

REPAIR METHOD FOR EXTERIOR ON A CONCRETE STRUCTURE

BACKGROUND OF THE INVENTION

1. Field of the Invention

This invention relates to a method for repairing the exterior of a building or other concrete structures to prevent flaking of exterior materials, such as bricks and tiles, which is brought about by cracking of the concrete wall base of the structure or by other possible causes.

2. Description of the Prior Art

The concrete wall base or groundwork of a building, concrete structure and so on are generally covered with exterior material such as tiles and bricks. Such exterior material is fixed onto the surface of the concrete wall base by using cement material such as mortar. The concrete wall base with the cement material is apt to crack owing to the influences of the weather and vibrations such as earthquakes. As a result, the strength of the union between the exterior materials and the wall base would decrease gradually by infiltration of rain water into the wall base through the cracks in the wall or by other possible causes. Thus, the exterior materials may flake off from the wall base and injure a passer-by, thereby possibly leading to a social problem.

In order to prevent such accidents, there have been performed visual inspections, sound inspection by which abnormalities in the wall base are found by tapping against the wall surface of the structure with a hammer and listening for changes in sound, and other non-destructive inspections. When a defective portion such as a crack in the concrete wall base or mortar setting bed covered with the tiles, the defective portion is repaired by boring holes in mortar joint portions between the adjacent tiles by use of a vibration-type drilling device, and driving anchor bolts into the holes.

Such a method of boring the holes in the mortar joint portions between the tiles and inserting the anchor bolts into the holes, might strengthen the wall base and mortar cement setting bed, but it has little effect on the exterior tiles. Furthermore, since the mortar setting bed is weak in strength, how the tiles are fixed relative to the concrete wall base is a problem. Therefore, flaking of the tiles remains a hazard.

SUMMARY OF THE INVENTION

It is, therefore, an object of this invention to provide an exterior repairing method for steadily fixing and reinforcing a defective portion, such as a crack in the concrete wall base or the cement setting bed of a concrete structure which are covered with exterior materials such as tiles or bricks, so that the exterior materials can be prevented from flaking off.

To accomplish the object described above according to this invention, there is provided a method for repairing an exterior material which is cemented to the concrete wall base of a structure. The method comprises boring an anchor hole from the exterior material to the concrete wall base through the cement layer by using a rotary drilling device, and driving an anchor bolt into the anchor hole.

A defective portion brought about by cracks in the concrete wall base or other possible causes is found by a non-destructive inspection. Then, one or more anchor holes are bored in the defective portion from the exterior material, such as tiles, to the concrete wall base.

The anchor bolt to be inserted into the anchor hole comprisesd a cylinder body incorporating a wedge member. Upon fitting the anchor bolt into the anchor hole, the cylinder body is expanded by driving the wedge member deep inside the cylinder body, to thereby expand and secure the anchor bolt with the anchor hole. Lastly, a sealing material is filled into and solidified inside the cylinder body and anchor hole, to integrally unite the exterior material with the wall base of the concrete structure by the fixedly secured anchor bolt. Thus, it is possible to reliably reinforce the cracked defective portion of the wall base and prevent the exterior material from flaking off.

BRIEF DESCRIPTION OF THE DRAWINGS

Other objects and features of the present invention will now be explained in detail with reference to the accompanying drawings, wherein.

DESCRIPTION OF THE PREFERRED EMBODIMENT

Figure 1:
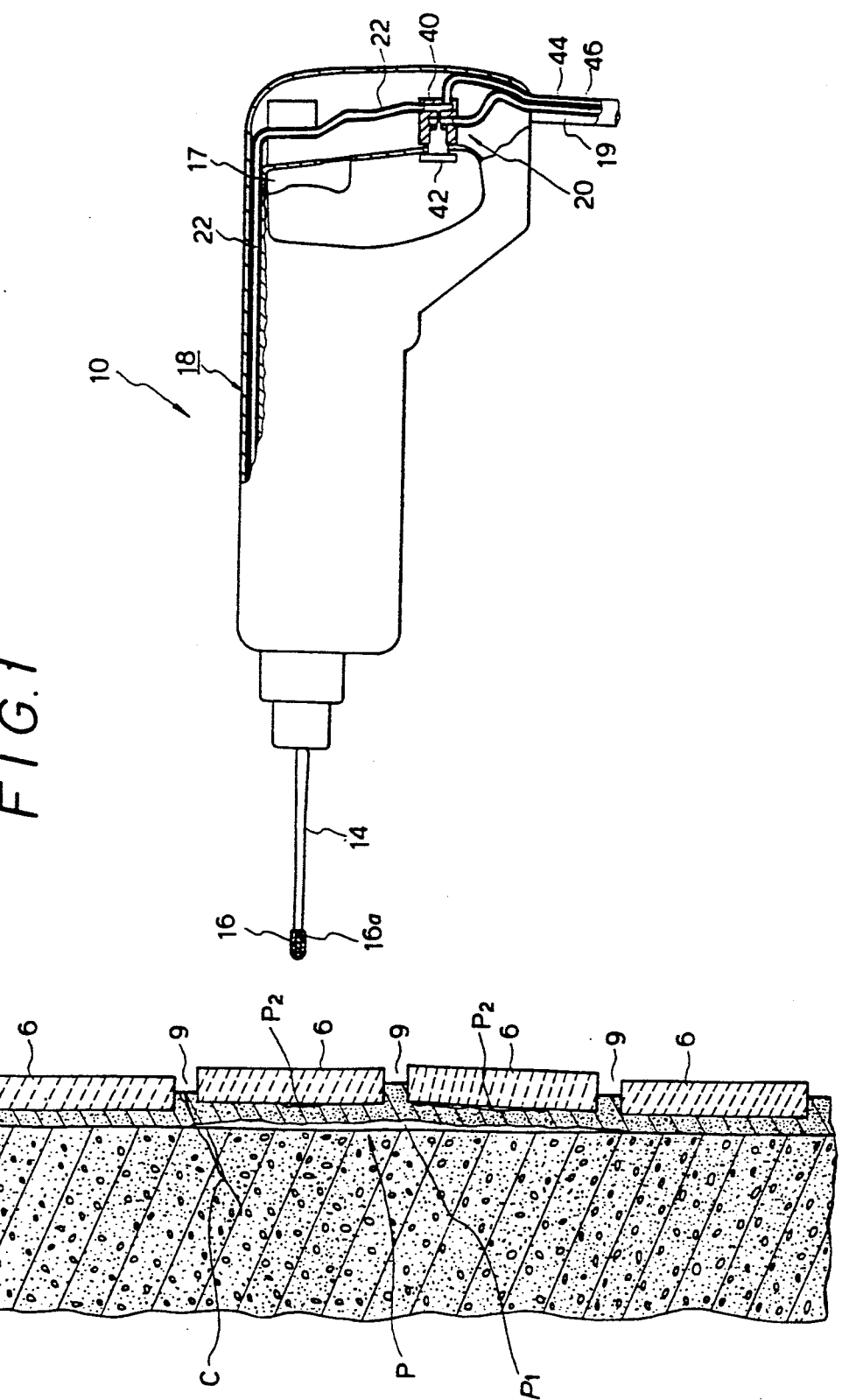
FIG. 1 is an explanatory diagram showing the state before forming an anchor hole in the wall base in a concrete structure, according to one embodiment of this invention.

FIG. 1 illustrates the facing of a concrete structure which is covered with exterior materials, such as ceramic tiles, in the same manner. That is, a concrete wall base 2 is covered with the exterior materials 6 through a cement layer 4, such as mortar, so as to form a wall surface 8. The exterior materials 6 are joined one another along a plane through joints 9 formed of, example, mortar.

At the outset, the wall surface 8 undergoes a visual inspection, a tapping inspection or other non-destructive inspecion to find a defect such as a crack C in the concrete wall base 2 and cement layer 4, or to find a vacant space P between the wall base 2 and cement layer 4. The vacant space P in the illustrated structure includes the vacancy P1 between the concrete wall base 2 and the cement layer 4, and the vacancy P2 between the cement layer 4 and the exterior material 6.

Upon finding the defect, such as the vacant space P, as the result of the inspection, an anchor hole 24 is bored from the surface of the exterior material 6 toward the defective portion in the wall base by use of a rotary drilling device 10. It is most preferable to use a drilling device capable of drilling through a rigid material while spouting a cooling fluid, as proposed in U.S. Pat. No. 5,004,382 to YOSHINO, for example. Another drilling device applicable to this case is disclosed in European Patent Specification No. 0,252,611 (B1). A drill for use in such a drilling device of mist-spouting type has an axial passage through which a mist fluid is supplied, as disclosed in U.S. Pat. No. 4,854,788 to OKINAGA, for example.

Figure 2:
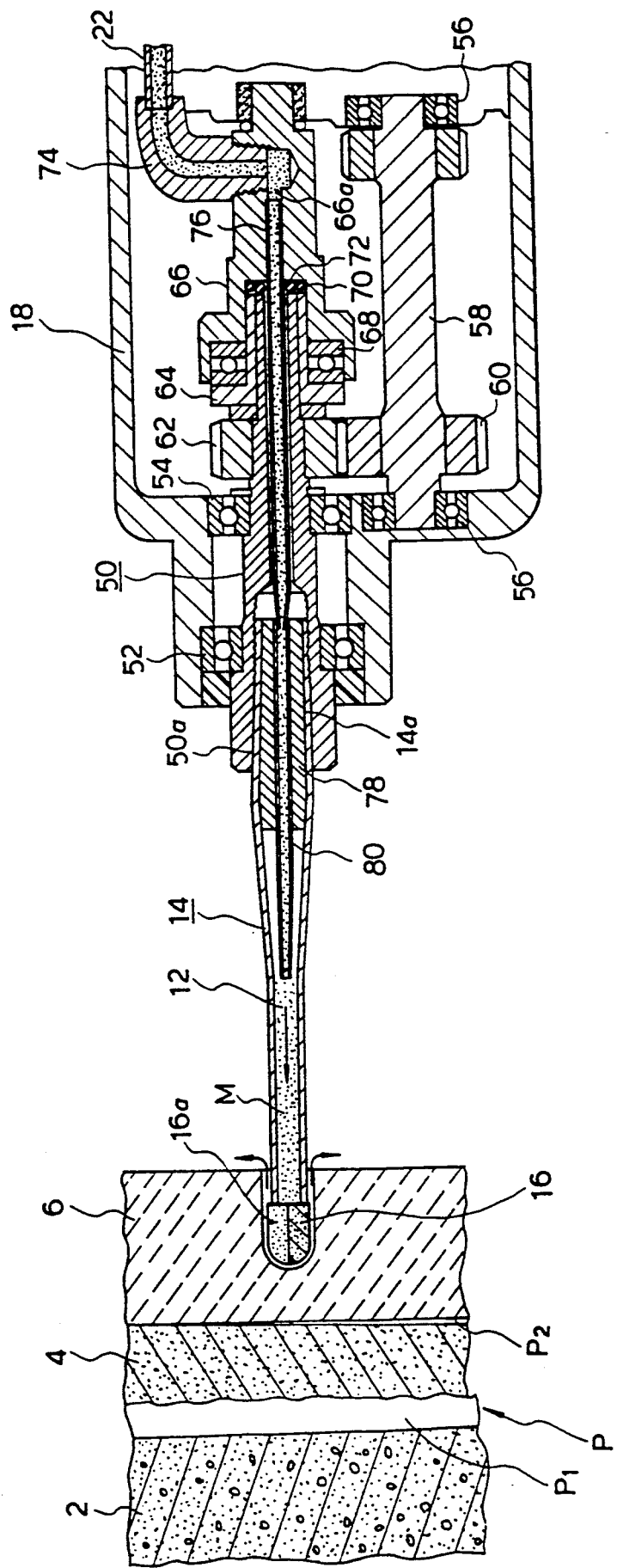
FIG. 2 is an explanatory diagram showing the boring of the anchor hole in the wall base.

To be more specific, the drilling device 10 in this embodiment is provided with a drill 14 having an axial mist passage 12, as illustrated in FIG. 2. A drill bit 16 disposed at the leading end of the drill 14 is formed by shaping ultra-hard abrasive grains, including, for example, diamond grains, into a cylinder and sintering it. The drill bit 16 has an outlet slit 16a communicating with the axial passage 12 to spout the cooling fluid therefrom. The drilling device 10 is driven by operating a power switch 17 to activate an electric motor (not shown).

As the cooling fluid to be supplied into the axial passage 12, there may be used water or mist-like fluid. The drilling device 18 in this embodiment has a mist generator 20 so as to produce a mist of spray. The mist M thus produced is fed into the axial mist passage 12 through a mist supply pipe 22 lying inside the body of the drilling device 18. In the case of using water as the cooling fluid, it is desirable to use regulator means including a constant flow pump so as to avoid supplying an excess of water. The structure of the mist generator 20 for producing the mist M will be described later.

By utilization of the aforenoted rotary drilling device 10, it is possible to successfully bore any material, e.g. hard nonmetallic materials such as ceramic tile, glass, and stone.

Figure 3A:
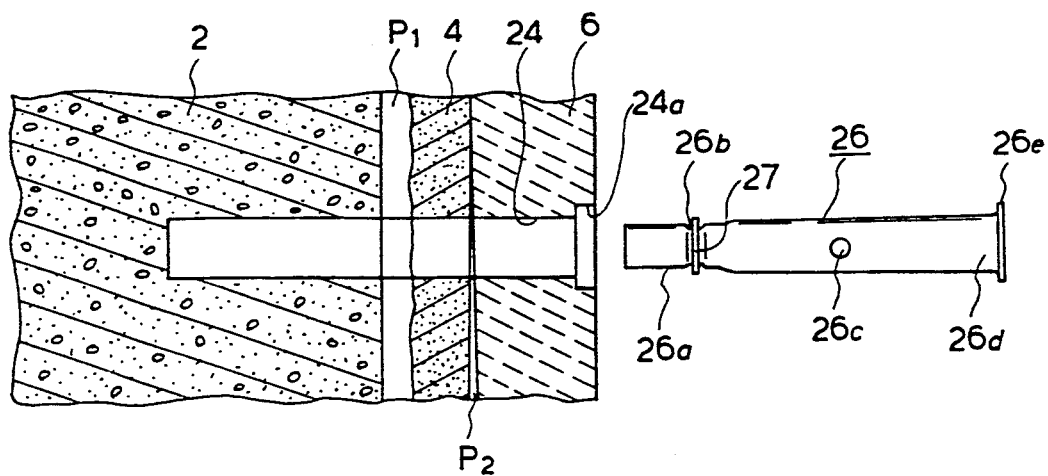
FIG. 3(A) through FIG. 3(D) are explanatory diagrams showing the process steps in which an anchor bokt is set in the hole in the wall base.

Upon boring the expansion anchor hole 24 extending from the surface of the exterior material 6 to the concrete wall base 2 of the structure, an expansion anchor bolt 26 having an outer diameter nearly equal to the diameter of the anchor hole 24 is inserted into the anchor hole 24 as shown in FIG. 3(A). The anchor bolt 26 used in this embodiment is formed in a cylinder shape and has a tapered bolt body 26d having a small diameter portion 26a, a contracted portion 26b and openings 26c. The anchor bolt 26 also includes 26e, a substantially C-shaped clamp member 27 fitted around the contracted portion 26b, and a wedge member 28 contained in the bolt 26d.

The anchor hole 24 in the wall of the structure is formed so as to have a relatively large opening edge step portion 24a for receiving the flange 26e of the anchor bolt 26.

Figure 3B:
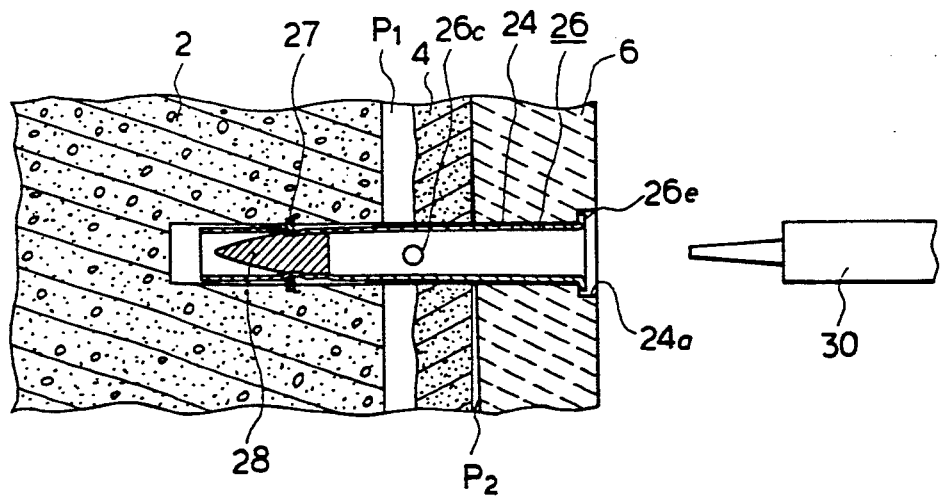

After inserting the expansion anchor bolt 26 into the anchor hole in the wall, the wedge member 28 is driven deep toward the small diameter portion 26a by use of a tool, as shown in FIG. 3(B). By forcibly thrusting the wedge member 28 into the small diameter portion 26a, the contracted portion 26b expands to spread the clamp member 27. As a result, the clamp member 27 bites into the inner surface of the anchor hole 24 to fixedly secure the anchor bolt 26 within the anchor hole 24.

It was confirmed experimentally that a 6 mm-diameter anchor bolt having the aforementioned structure exhibits 100 kg to 150 kg in breaking strength against a drawing force when the clamp member 27 bites 0.1 mm deep. Compared with a common expansion anchor bolt having no C-shaped clamp member which shows a breaking strength of the order of 30 kg, the aforenoted anchor bolt used in this embodiment is appreciably stronger.

Figure 3C:
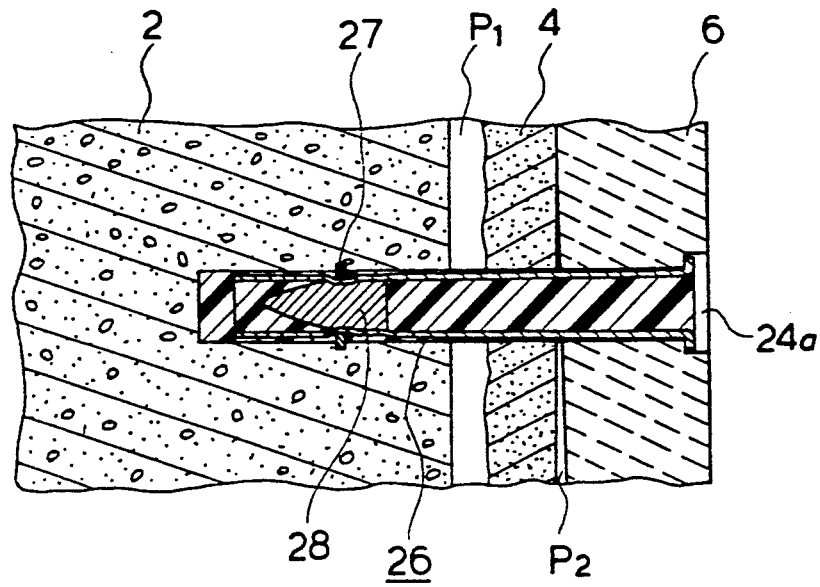
Figure 3D:
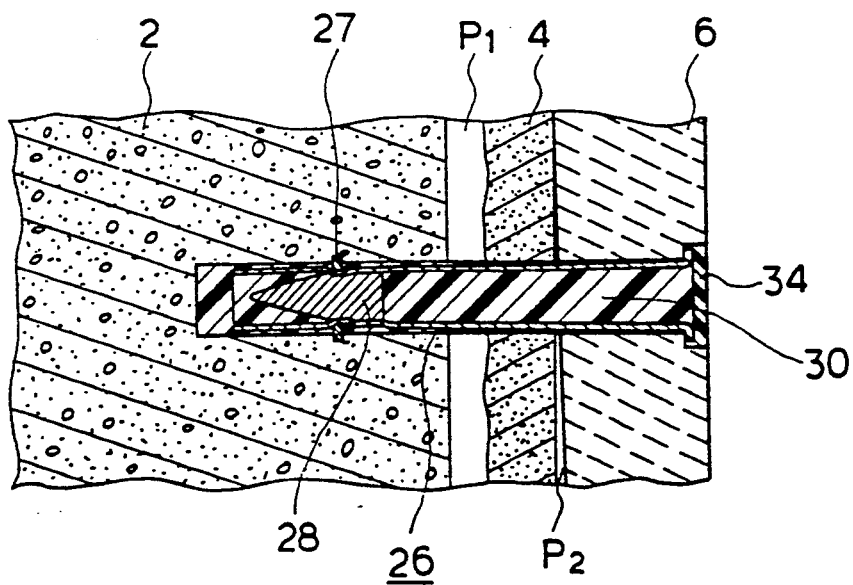

Though the defective wall base 2 can be sufficiently reinforce by the anchor bolt 26 as noted above, it is preferable to fill sealing material 30 into the space around and inside the anchor bolt 26 fitted in the anchor hole 24 for the purpose of waterproofing, as shown in FIG. 3(C). As the sealing material 30, there may be appropriately used as elastomeric epoxy putty. The sealing material 30 which is injected inside the anchor bolt flows out through the openings 26c formed in the bolt body 26b and extends all over the inside of the anchor hole 24.

When an anchor bolt of 6 mm in outer diameter, 0.8 mm in thickness, and 55 mm, in length and having the bolt body tapered at an angle of 3° to 5° was experimentally used, satisfactory results were obtained. Namely, with this anchor bolt having the tapered bolt body, the sealing material, when injected into inside the anchor bolt and anchor hole, could be effectively prevented from leaking out from between the inner surface of the anchor wall and the outer surface of the tapered bolt body.

After filling the anchor hole 24 with the sealig material 30, the opening portion defined by the opening edge step portion 24a may be covered with a cover material 34, such as a resin putty, after solidifying the sealing material 30. It is desirable to finish the wall surface thus applied with the cover material 34 by painting the surface with paint of the same color as the exterior material 6.

As stated above, while the exterior material 6 on the defective portion P of the cracked wall base 2 can be securely fixed by means of the anchor bolt 26, the structure including the wall base 2 and cement layer portion 4 can also be reinforced and the exterior material 6 can be prevented from flaking off. Thus, the life of the structure itself can be lengthened.

Figure 4:
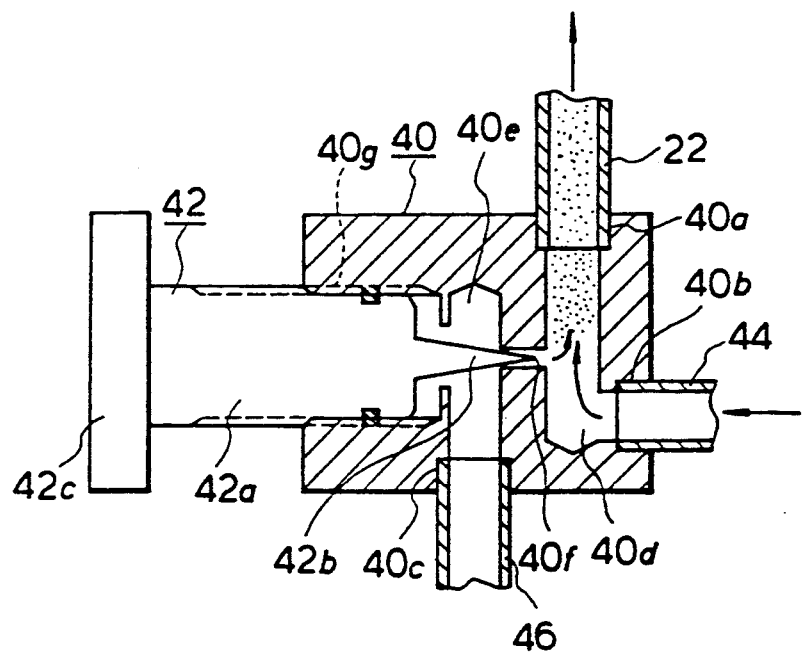
FIG. 4 is a schematic diagram showing a mist generator in a drilling device of mist-spouting type used in the method of this invention.

Now, the mist generator 20 of the rotary drilling device 10 used in this embodiment will be explained. The mist generator 20 comprises a connector member 40, and a regulator 42 for regulating the flow quantity of water flowing therethrough, as shown in FIG. 4. The connector member 40 has a connection port 40a to which the mist supply pipe 22 is connected, a connection port 40b to which an air supply pipe 44 is connected, a connection port 40c to which a water supply pipe 46 extending from a water source (not shown) is connected, a passage 40d through which the connection ports 40a and 40b communicate with each other, and a sump portion 40e for temporarily storing water from the water source. The passage 40d and sump portion 40e are connected to each other through an orifice 40f.

The connector member 40 has a threaded portion 40g into which the flow regulator 42 is screwed. The flow regulator 42 comprises an outer screw thread portion 42a to be engaged with the threaded portion 40g of the connector member 40, a regulating needle member 42b confronting the orifice 40f between the passage 40d and sump portion 40e, and a rotary know 42c for turning the flow regulator 42 to regulate the amount of water flowing through the orifice 40f. By operating the rotary knob 42c, the density of the mist generated by the mist generator 20 can be controlled. The water supplied from the water source through the water supply pipe 46 is made into the mist M with compressed air supplied through the air supply pipe 44 into the passage 40d.

The mist generator 20 having the flow regulator 42 is incorporated in the drilling device 10 as shown in FIG. 1, and the mist supply pipe 22 of the mist generator 20 is connected to the hollow drill 14 mounted on the drilling device 10 as shown in FIG. 2. That is, the drill 14 is connected to a hollow rotary shaft 50 retained rotatably inside the drill casing 18 by means of bearings 52 and 54. The rotary shaft 50 is engaged with a driving shaft 58 of an electric motor (not shown) through gears 60 and 62. The driving shaft 58 is rotatably supported inside the drill casing 18 by bearings 56. The hollow drill 14 is provided at its rear end with a rotary connection member 64 coupled to a stationary connection member 66 having a mist passage 66a. Between the rotary connection member 64 and the stationary connection member 66 there are disposed a thrust bearing 68 and sealing rings 70 and 72 having different diameters. The mist supply pipe 22 is connected to a connector member 74 to communicate the mist passage 40d in the mist generator 40 and the mist passage 66a in the stationary connection member 66.

The hollow rotary shaft 50 is provided at its leading end with a drill holder 50a for receiving the tapered shank 14a of the drill 14. Thus, the drill 14 is fixedly connected to the rotary shaft 50 by screwing the drill shank 14a into the drill holder 50a. To heighten the effect of discharging the mist at a high speed through the mist passage 12, a slender nozzle 76 is inserted inside the stationary connection member 66 and extends to the rear end of the rotary shaft 50. In addition, a slender throat 80 in inserted inside the hollow shaft 50. With the nozzle 76 and throat 80, the mist M flows through the mist passage 12 at a high speed and is prevented from being condensed into water.

According to the exterior repair method of this invenntion, defects in various concrete structures, which are brought about by cracks or other possible causes, can be effectively made up for to steadily reinforce the structure. Particularly, exterior materials such as tiles or bricks on the defective wall base of the concrete structure can be prevented from flaking off. Since the union of the exterior materials and concrete wall base is strengthened by the repair method of this invention, the concrete structure becomes durable to prolong the life thereof.

As can be readily appreciated, it is possible to deviate from the above embodiments of the present invention and, as will be readily understood by those skilled in this art, the invention is cabable of many modifications and improvements within the scope and spirit thereof. Accordingly, it will be understood that the invention is not to be limited by these specific embodiments, but only by the scope and spirit of the appended claims.

What is claimed is:

1. A method for repairing a structure having a concrete base, an exterior material covering an exterior of the concrete base, and a cement layer attaching the exterior material to the concrete base, said method comprising the steps of:

inspecting the structure, by use of a non-destructive inspection, to find a location of a defective portion therein;

providing a rotary drilling device comprising a hollow drill having an axial mist passage at its leading end, a drill bit formed of ultra-hard abrasive grains, and a mist generator for producing and supplying a fluid mist through said mist passage, such that said fluid mist spouts from the drill bit during drilling;

operating the rotary drilling device to drill an anchor hole, at the location of the defective portion, through the exterior material, through the cement layer and into the concrete base;

providing an anchor bolt comprising a tapered bolt body having a contracted portion, a substantially C-shaped clamp member fitted around the contracted portion, and a wedge member;

driving the anchor bolt into the anchor hole; and thrusting the wedge member through the bolt body and into the contracted portion thereof, so as to expand the contracted portion and the C-shaped clamp member outwardly to bite into the portion of the concrete base surrounding the anchor hole.

2. A method as recited in claim 1, further comprising providing at least one opening through the bolt body; and injecting a sealing material into the anchor hole to fixedly secure the anchor bolt in the anchor hole.

3. A method as recited in claim 1, further comprising providing at least one opening through the bolt body; and injecting a sealing material into the bolt body after the anchor bolt has been driven into the anchor hole and after the wedge member has been thrust through the bolt body, such that the sealing material fills the bolt body and flows through the at least one opening in the bolt body to fill any space around the anchor bolt in the anchor hole.

4. A method as recited in claim 3, wherein in said step of providing the anchor bolt, the bolt body of the anchor bolt provided has a small diameter portion adjacent the contracted portion.

5. A method as recited in claim 3, wherein in said step of providing the anchor bolt, the wedge member of the anchor bolt is mounted within the bolt body prior to said step of driving the anchor bolt into the anchor hole.

6. A method as recited in claim 3, wherein in said step of providing a rotary drilling device, the mist generator of the rotary drilling device provided comprises a connector member and a flow regulator, said connector member having a mist connection port adapted to be connected to a mist supply pipe, a water connection port adapted to be connected to a water supply pipe, an air connection port adapted to be connected to an air supply pipe, a passage fluidically connecting the mist connection port, the water connection port and the air supply port, a sump portion for temporarily storing water, and an orifice, and said flow regulator being operable to control water flow through said orifice.

* * * * *